Feb. 21, 1933.   C. P. DEIBEL   1,898,344
DRY CELL
Filed March 15, 1930
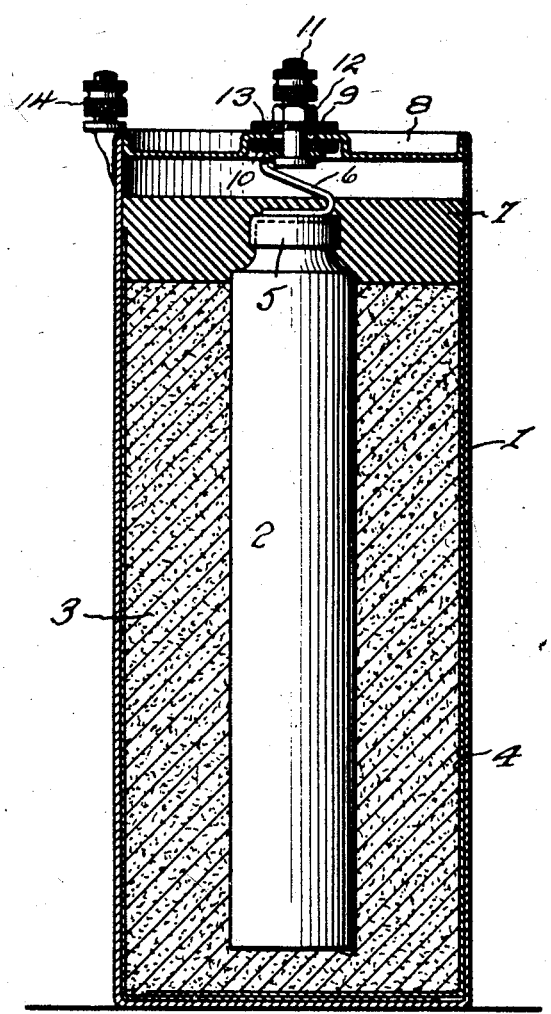
Inventor
C. P. Deibel
By Hull, Brock West
Attorney Patented Feb. 21, 1933

1,898,344

UNITED STATES PATENT OFFICE

CYRIL P. DEIBEL, OF LAKEWOOD, OHIO

DRY CELL

Application filed March 15, 1930. Serial No. 436,059.

This invention relates to dry cell batteries and is of general application although the preferred embodiment of my invention relates to batteries which are generally known as "6-inch cells".

Heretofore the efficiency as well as the shelf life of dry cells have been materially impaired due to what is known as "gassing" or "breathing" of the cells which results in a drying out of the materials forming the cells and a general decrease in the efficiency and shelf life of the cell.

It is therefore the main object of this invention to provide a dry cell in which this gassing or breathing is reduced to a minimum.

A further object of the invention is to provide a dry cell in which the mass of mix is covered with a layer of plastic sealing material, such as soft tar or pitch, which will pemit excessive pressure within the cell to be relieved and at the same time prevent entrance of air back into the mix.

A further object of the invention is to provide a dry cell of the character described in which the mass of mix is hermetically sealed and which is also provided with means for preventing the escape of the sealing material.

Further and more limited objects of the invention will appear as the description proceeds and by reference to the accompanying drawing in which the single figure is a vertical sectional view disclosing the preferred embodiment.

Referring now to the drawing, the reference character 1 designates a metal container which is preferably formed of zinc and within which is arranged a carbon electrode 2 and a mass 3 of depolarizing mix. Surrounding the mass of mix and insulating the same from the container is a liner 4 which extends upwardly above the level of the mix as shown. The upper end of the carbon electrode 2 is slightly reduced and secured thereover is a cap 5, preferably formed of brass. Secured to the brass cap 5 is a slightly resilient substantially S-shaped member 6 which is preferably soldered or welded to the brass cap. Completely covering the mass of mix and also the upper end of the carbon electrode is a layer of sealing material 7, preferably soft tar or pitch. This layer of sealing material bonds with the walls of the zinc container and hermetically seals the mass of mix. The upper end of the container is closed by a cover 8 which is preferably a zinc plate or disk having a central opening 9 therein surrounded by an annular depression in which fits a fiber disk or washer 10.

The upper end of the S-shaped member 6 is provided with an opening through which extends a pin 11. The pin 11 also extends through the central opening provided in the fiber disk or washer 10 and is secured in place by a nut 12 which is insulated from the cover plate 8 by means of a washer 13. The pin 11 serves as one of the terminals of the battery. The other terminal 14 is connected with the zinc can in a manner well known to those skilled in the art.

It will be seen that the cover 8 is slightly spaced from the layer of sealing material so as to provide an expansion chamber above the layer of sealing material. The openings in the disks or washers 10 and 13 are of such size as to afford a sufficient opening to permit excessive pressure to escape around the terminal and yet not permit the layer of plastic sealing material to escape.

This construction provides a very efficient seal for batteries and prolongs the shelf life of the battery as it prevents drying out of the materials forming the battery.

When excessive pressure is obtained in the cell, the gas bubbles up through the plastic pitch and escapes. The pitch flows together after the bubble of gas has escaped and seals what would otherwise remain a permanent channel through which the cell could dry out.

Various changes may be made in the details of construction as well as in the manner of arranging and securing the various parts in position without departing from the spirit of my invention. It is therefore to be understood that the embodiment of the invention herein disclosed is merely illustrative and is not to be considered in a limiting sense. In the claims the expression "plastic sealing material" is used to define the layer of sealing material indicated by the reference character 7 and which may be of soft tar or pitch or other similar material which will permit gas bubbles to escape and then close to prevent the ingress of air therethrough, that is to say, a self-closing seal. The invention is to be limited only in accordance with the scope of the appended claims.

Having thus described my invention, what I claim is:

1. A dry cell comprising a zinc can, a carbon electrode and a mass of depolarizing mix arranged within said zinc can and insulated therefrom, a layer of plastic self-sealing material covering said mass of mix and bonded with the walls of said can, a cover closing the upper end of said can and a terminal extending through said cover and connected with said carbon electrode, said carbon electrode terminating below the top of said layer of sealing material.

2. A dry cell comprising a zinc can, a carbon electrode and a mass of depolarizing mix arranged within said zinc can and insulated therefrom, a layer of plastic self-sealing material covering said mass of mix and bonded with the walls of said can, a cover closing the upper end of said can and a terminal extending through said cover and connected with said carbon electrode, said cover being spaced from the said layer of sealing material whereby to provide an expansion chamber, said carbon electrode terminating below the top of said layer of sealing material.

3. A dry cell comprising a zinc can, a carbon electrode and a mass of depolarizing mix arranged within said zinc can and insulated therefrom, a layer of plastic material covering said mass of mix and bonded with the walls of said can, a cover closing the upper end of said can and a terminal extending through said cover and connected with said carbon electrode, said cover being spaced from the said layer of sealing material whereby to provide an expansion chamber, said carbon electrode terminating below the top of said layer of sealing material, said layer of sealing material consisting of soft pitch.

4. A dry cell comprising a zinc can, a carbon electrode and a mass of depolarizing mix arranged within said zinc can and insulated therefrom, a layer of plastic material covering said mass of mix and bonded with the walls of said can, a cover closing the upper end of said can, a terminal extending through said cover and connected with said carbon electrode, said cover being spaced from the said layer of sealing material whereby to provide an expansion chamber, said carbon electrode terminating below the top of said layer of sealing material, said terminal being insulated from said cover and loosely secured thereto so as to permit excessive pressure to escape around said terminal.

5. A dry cell comprising a metal container containing a carbon electrode and a mass of depolarizing mix insulated therefrom, a layer of plastic sealing material completely covering said carbon electrode and mass of mix and bonded with the walls of said container, a metal cover closing the end of said container and spaced from said layer of sealing material, said cover having an opening therein, a terminal extending through said opening and having a resilient connection with said carbon electrode, means insulating said terminal from said cover and connected therewith so as to permit excessive pressure to escape about said terminal.

6. A dry cell comprising a container having a mass of depolarizing mix and a central electrode therein, a metallic cap covering the end of said carbon electrode, a layer of plastic sealing material covering said mass of mix and extending upwardly around said metallic cap, a cover closing the upper end of said container, and a terminal extending through said cover and connected with said metallic cap.

In testimony whereof, I hereunto affix my signature.

CYRIL P. DEIBEL.